United States Patent
Shrestha et al.

(10) Patent No.: US 12,468,749 B2
(45) Date of Patent: Nov. 11, 2025

(54) SYSTEMS AND METHODS FOR INFORMATION RETRIEVAL

(71) Applicants: Samsung Electronics Co., Ltd., Suwon-si (KR); The Texas A&M University System, College Station, TX (US)

(72) Inventors: Susav Lal Shrestha, College Station, TX (US); Zongwang Li, Dublin, CA (US); Narasimha Annapareddy, College Station, TX (US)

(73) Assignees: SAMSUNG ELECTRONICS CO., LTD. (KR); THE TEXAS A&M UNIVERSITY SYSTEM, College Station, TX (US)

( * ) Notice: Subject to any disclaimer, the term of this patent is extended or adjusted under 35 U.S.C. 154(b) by 0 days.

(21) Appl. No.: 18/948,447

(22) Filed: Nov. 14, 2024

(65) Prior Publication Data
US 2025/0190481 A1    Jun. 12, 2025

Related U.S. Application Data

(60) Provisional application No. 63/607,000, filed on Dec. 6, 2023.

(51) Int. Cl.
G06F 16/00 (2019.01)
G06F 16/43 (2019.01)

(52) U.S. Cl.
CPC .................................. *G06F 16/43* (2019.01)

(58) Field of Classification Search
CPC ....................................................... G06F 16/43
See application file for complete search history.

(56) References Cited

U.S. PATENT DOCUMENTS

2025/0077496 A1* 3/2025 Skelton ............... G06F 16/2477

* cited by examiner

*Primary Examiner* — Ajith Jacob
(74) *Attorney, Agent, or Firm* — Renaissance IP Law Group LLP

(57) ABSTRACT

Provided are systems, methods, and apparatuses for systems and methods of memory efficient multi-vector information retrieval based on embeddings from a storage pipelined network. In one or more examples, the systems, devices, and methods include performing a first portion of a nearest neighbor search on a first subset of a set of media sources; performing a fetch process on the first subset that include identifying a first set of highest matching media sources from the first subset, transferring multi-vector representations of the first set of highest matching media sources from a storage drive to a memory, and performing a second ranking of the first set highest matching media sources. The systems, devices, and methods include performing, in parallel with the fetch process, a second portion of the nearest neighbor search on a second subset of the set of media sources.

20 Claims, 7 Drawing Sheets

SYSTEMS AND METHODS FOR INFORMATION RETRIEVAL

CROSS-REFERENCE TO RELATED APPLICATIONS

This application claims the benefit of U.S. Provisional Patent Application Ser. No. 63/607,000, filed Dec. 6, 2023, which is incorporated by reference herein for all purposes.

TECHNICAL FIELD

The disclosure relates generally to memory systems, and more particularly to systems and methods of information retrieval.

BACKGROUND

The present background section is intended to provide context only, and the disclosure of any concept in this section does not constitute an admission that said concept is prior art.

Information retrieval (IR) can include finding a collection of data and/or finding relevant information from the collection of data. IR can include searching for and retrieving information from various sources, such as databases, the internet, and digital libraries. IR systems can provide an interface between users and large data repositories, such as textual repositories. IR systems can use techniques, algorithms, and methodologies to organize and access large quantities of information. Performing information retrieval may be referred to as performing a search (e.g., searching databases of texts, images, or audio). Information retrieval can include searching for media (e.g., documents, text, images, audio), searching for information in the media, and/or searching for metadata that describes the media. In the case of document retrieval, queries can be based on full-text or other content-based indexing.

SUMMARY

In various embodiments, the systems and methods described herein include systems, methods, and apparatuses for systems and methods of information retrieval. In some aspects, the techniques described herein relate to a method including: performing a first portion of a nearest neighbor search on a first subset of a set of media sources based on comparing a single vector representation of a query to single vector representations of the first subset; performing a fetch process on the first subset, the fetch process including: identifying a first set of highest matching media sources from the first subset based on a first ranking of the first subset determined from the first portion of the nearest neighbor search; transferring multi-vector representations of the first set of highest matching media sources from a storage drive to a memory based on the first ranking; and performing a second ranking of the first set highest matching media sources; and performing, in parallel with the fetch process, a second portion of the nearest neighbor search on a second subset of the set of media sources based on comparing the single vector representation of the query to single vector representations of the second subset.

In some aspects, the techniques described herein relate to a method, further including: identifying a missing media source that is missing from the first set of highest matching media sources based on comparing identifiers of the first set of highest matching media sources with identifiers of a second set of highest matching media sources, the second set of highest matching media sources being determined based on performing the second portion of the nearest neighbor search; and transferring a multi-vector representation of the missing media source from the storage drive to the memory.

In some aspects, the techniques described herein relate to a method, further including determining a third set of highest matching media sources based on a third ranking of the first set of highest matching media sources, the second set of highest matching media sources, and the missing media source.

In some aspects, the techniques described herein relate to a method, further including: loading media corresponding to the third set of highest matching media sources into the memory; and providing an answer to the query based on loading the media into the memory.

In some aspects, the techniques described herein relate to a method, further including: storing, based on an offline process performed prior to receiving the query, the single vector representations of the first subset and the single vector representations of the second subset in system memory different from the memory; and storing, based on the offline process, the multi-vector representations of the set of media sources in the storage drive, wherein the multi-vector representations of the set of media sources include multi-vector representations of the first subset and multi-vector representations of the second subset, the multi-vector representations of the first subset including the multi-vector representations of the first set of highest matching media sources.

In some aspects, the techniques described herein relate to a method, wherein the first ranking is based on similarity scores determined from comparing the single vector representation of the query to the single vector representations of the first subset.

In some aspects, the techniques described herein relate to a method, further including storing the single vector representation of the query in the memory, the memory including memory of one or more accelerators.

In some aspects, the techniques described herein relate to a method, further including wherein the first set of highest matching media sources includes a ranked list of document identifiers.

In some aspects, the techniques described herein relate to a method, further including wherein the ranked list includes a set number of document identifiers.

In some aspects, the techniques described herein relate to a method, wherein the set of media sources include at least one of a document, text, an image, audio, or metadata of the media.

In some aspects, the techniques described herein relate to a device including: one or more processors; and memory storing instructions that, when executed by the one or more processors, cause the device to: perform a first portion of a nearest neighbor search on a first subset of a set of media sources based on comparing a single vector representation of a query to single vector representations of the first subset; perform a fetch process on the first subset, the fetch process including: identify a first set of highest matching media sources from the first subset based on a first ranking of the first subset determined from the first portion of the nearest neighbor search; transfer multi-vector representations of the first set of highest matching media sources from a storage drive to a memory based on the first ranking; and perform a second ranking of the first set highest matching media sources; and perform, in parallel with the fetch process, a second portion of the nearest neighbor search on a second subset of the set of media sources based on comparing the single vector representation of the query to single vector representations of the second subset.

In some aspects, the techniques described herein relate to a device, wherein the instructions, when executed by the one or more processors, further cause the device to: identify a missing media source that is missing from the first set of highest matching media sources based on comparing identifiers of the first set of highest matching media sources with identifiers of a second set of highest matching media sources, the second set of highest matching media sources being determined based on performing the second portion of the nearest neighbor search; and transfer a multi-vector representation of the missing media source from the storage drive to the memory.

In some aspects, the techniques described herein relate to a device, wherein the instructions, when executed by the one or more processors, further cause the device to determine a third set of highest matching media sources based on a third ranking of the first set of highest matching media sources, the second set of highest matching media sources, and the missing media source.

In some aspects, the techniques described herein relate to a device, wherein the instructions, when executed by the one or more processors, further cause the device to: load media corresponding to the third set of highest matching media sources into the memory; and provide an answer to the query based on loading the media into the memory.

In some aspects, the techniques described herein relate to a device, wherein the instructions, when executed by the one or more processors, further cause the device to: store, based on an offline process performed prior to receiving the query, the single vector representations of the first subset and the single vector representations of the second subset in system memory different from the memory; and store, based on the offline process, the multi-vector representations of the set of media sources in the storage drive, wherein the multi-vector representations of the set of media sources include multi-vector representations of the first subset and multi-vector representations of the second subset, the multi-vector representations of the first subset including the multi-vector representations of the first set of highest matching media sources.

In some aspects, the techniques described herein relate to a device, wherein the first ranking is based on similarity scores determined from comparing the single vector representation of the query to the single vector representations of the first subset.

In some aspects, the techniques described herein relate to a device, wherein the instructions, when executed by the one or more processors, further cause the device to store the single vector representation of the query in the memory, the memory including memory of one or more accelerators.

In some aspects, the techniques described herein relate to a non-transitory computer-readable medium storing code that includes instructions executable by a processor to: perform a first portion of a nearest neighbor search on a first subset of a set of media sources based on comparing a single vector representation of a query to single vector representations of the first subset; perform a fetch process on the first subset, the fetch process including: identify a first set of highest matching media sources from the first subset based on a first ranking of the first subset determined from the first portion of the nearest neighbor search; transfer multi-vector representations of the first set of highest matching media sources from a storage drive to a memory based on the first ranking; and perform a second ranking of the first set highest matching media sources; and perform, in parallel with the fetch process, a second portion of the nearest neighbor search on a second subset of the set of media sources based on comparing the single vector representation of the query to single vector representations of the second subset.

In some aspects, the techniques described herein relate to a non-transitory computer-readable medium, wherein the code includes further instructions executable by the processor to: identify a missing media source that is missing from the first set of highest matching media sources based on comparing identifiers of the first set of highest matching media sources with identifiers of a second set of highest matching media sources, the second set of highest matching media sources being determined based on performing the second portion of the nearest neighbor search; and transfer a multi-vector representation of the missing media source from the storage drive to the memory.

In some aspects, the techniques described herein relate to a non-transitory computer-readable medium, wherein the code includes further instructions executable by the processor to determine a third set of highest matching media sources based on a third ranking of the first set of highest matching media sources, the second set of highest matching media sources, and the missing media source.

A computer-readable medium is disclosed. The computer-readable medium can store instructions that, when executed by a computer, cause the computer to perform substantially the same or similar operations as described herein are further disclosed. Similarly, non-transitory computer-readable media, devices, and systems for performing substantially the same or similar operations as described herein are further disclosed.

The systems and methods described herein include multiple advantages and benefits. For example, based on the techniques described, the systems and methods offload re-ranking embeddings (e.g., the entire re-ranking embeddings) to storage drives (e.g., SSDs), thereby reducing memory requirements in relation to approximate nearest neighbor searches. The systems and methods may include an approximate nearest neighbor (ANN)-based prefetching mechanism with hit rates exceeding 90%. The systems and methods may improve NAND-based-storage retrieval (e.g., by up to 6.4×), while maintaining near memory levels of query latency. Prefetching mechanisms may be used based on some processing sequences (e.g., processing sequences of LLMs, ANNs) being well defined and anticipatable. Prefetching data for LLMs and/or ANNs can include a data fetching process that is performed before a processor requests the data being prefetched. For example, a portion of data expected to be used by the processor may be prefetched, and thus part of the available bandwidth may be used during prefetch and part of the available bandwidth may be used during any fetching that occurs after the processor requests the data. Accordingly, the systems and methods provide a bandwidth efficient solution that enables a given system to scale to larger query batches while maintaining hit rates and reducing memory requirements. The systems and methods reduce the index memory footprint (e.g., latency and memory requirements of index sizes associated with multi-vector information retrieval (IR) models) and accelerates storage access allowing efficient and scalable inference of Neural Multi-Vector Information Retrieval. The considerable index sizes of multi-vector IR models often present a substantial challenge when implementing such systems at scale. However, the systems and methods offload the re-ranking embeddings (e.g., the entire re-ranking embeddings) to storage drives (e.g., SSDs) and reduce the memory requirements several factors (e.g., up to 16× reduction). Thus, the systems and methods reduce the index memory footprint and accelerate storage access allowing efficient and scalable inference of Neural Multi-Vector Information Retrieval

BRIEF DESCRIPTION OF THE DRAWINGS

The above-mentioned aspects and other aspects of the present systems and methods will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

Figure 1:
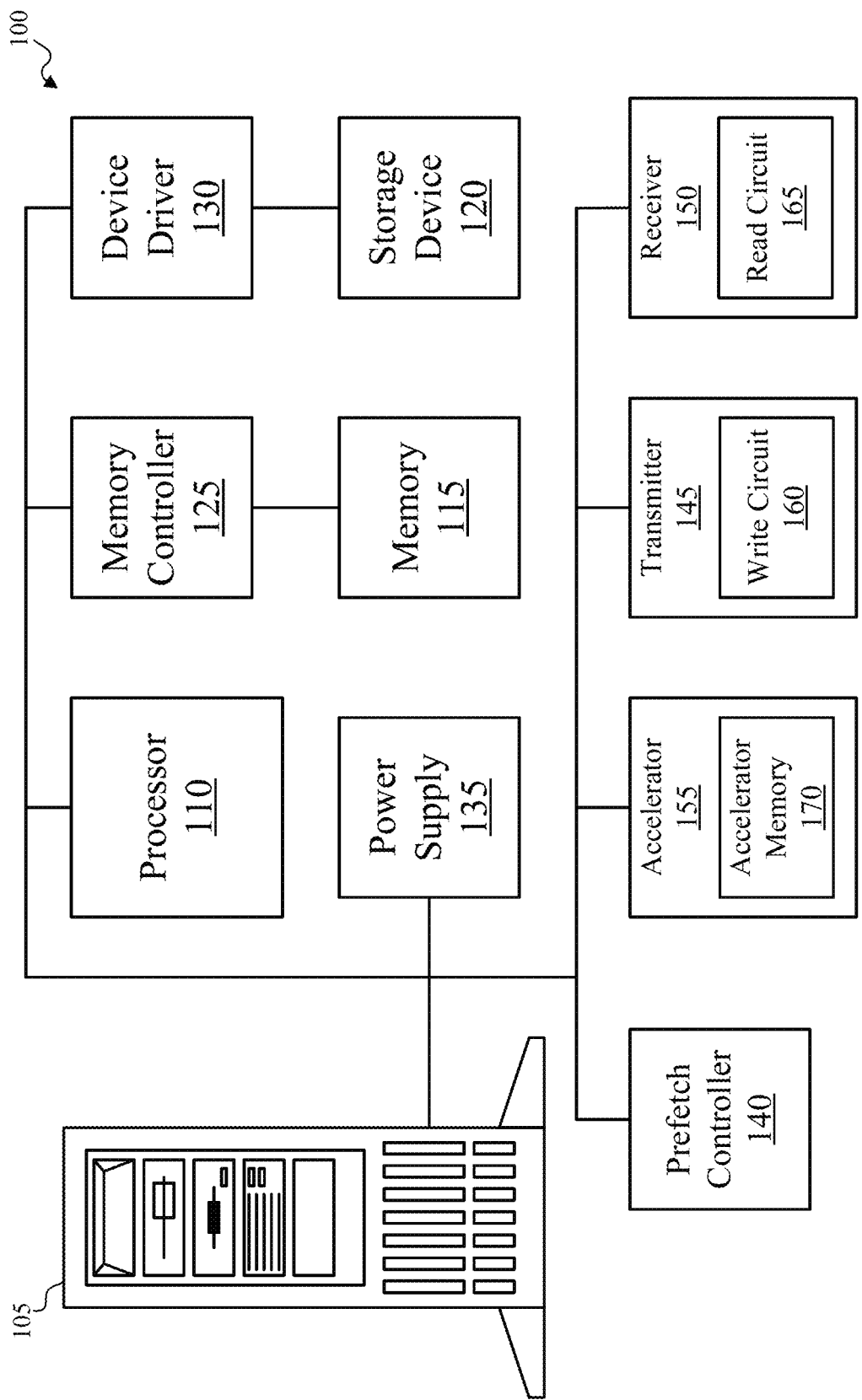
FIG. 1 illustrates an example system in accordance with one or more implementations as described herein.

While the present systems and methods are susceptible to various modifications and alternative forms, specific embodiments thereof are shown by way of example in the drawings and will herein be described. The drawings may not be to scale. It should be understood, however, that the drawings and detailed description thereto are not intended to limit the present systems and methods to the particular form disclosed, but to the contrary, the intention is to cover all modifications, equivalents, and alternatives falling within the spirit and scope of the present systems and methods as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may include conductive-bridging random-access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially, such that one instruction is retrieved, loaded, and executed at a time. In some example embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on chip (SoC), an assembly, and so forth.

The following description is presented to enable one of ordinary skill in the art to make and use the subject matter disclosed herein and to incorporate it in the context of particular applications. While the following is directed to specific examples, other and further examples may be devised without departing from the basic scope thereof.

Various modifications, as well as a variety of uses in different applications, will be readily apparent to those skilled in the art, and the general principles defined herein may be applied to a wide range of embodiments. Thus, the subject matter disclosed herein is not intended to be limited to the embodiments presented, but is to be accorded the widest scope consistent with the principles and novel features disclosed herein.

In the description provided, numerous specific details are set forth in order to provide a more thorough understanding of the subject matter disclosed herein. It will, however, be apparent to one skilled in the art that the subject matter disclosed herein may be practiced without necessarily being limited to these specific details. In other instances, well-known structures and devices are shown in block diagram form, rather than in detail, in order to avoid obscuring the subject matter disclosed herein.

All the features disclosed in this specification (e.g., any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Various features are described herein with reference to the figures. It should be noted that the figures are only intended to facilitate the description of the features. The various features described are not intended as an exhaustive description of the subject matter disclosed herein or as a limitation on the scope of the subject matter disclosed herein. Additionally, an illustrated example need not have all the aspects or advantages shown. An aspect or an advantage described in conjunction with a particular example is not necessarily limited to that example and can be practiced in any other examples even if not so illustrated, or if not so explicitly described.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

It is noted that, if used, the labels left, right, front, back, top, bottom, forward, reverse, clockwise and counterclockwise have been used for convenience purposes only and are not intended to imply any particular fixed direction. Instead, the labels are used to reflect relative locations and/or directions between various portions of an object.

Any data processing may include data buffering, aligning incoming data from multiple communication lanes, forward error correction ("FEC"), and/or others. For example, data may be first received by an analog front end (AFE), which prepares the incoming for digital processing. The digital portion (e.g., DSPs) of the transceivers may provide skew management, equalization, reflection cancellation, and/or other functions. It is to be appreciated that the process described herein can provide many benefits, including saving both power and cost.

Moreover, the terms "system," "component," "module," "interface," "model," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless explicitly stated otherwise, each numerical value and range may be interpreted as being approximate, as if the word "about" or "approximately" preceded the value of the value or range. Signals and corresponding nodes or ports might be referred to by the same name and are interchangeable for purposes here.

While embodiments may have been described with respect to circuit functions, the embodiments of the subject matter disclosed herein are not limited. Possible implementations may be embodied in a single integrated circuit, a multi-chip module, a single card, system-on-a-chip, or a multi-card circuit pack. As would be apparent to one skilled in the art, the various embodiments might also be implemented as part of a larger system. Such embodiments may be employed in conjunction with, for example, a digital signal processor, microcontroller, field-programmable gate array, application-specific integrated circuit, or general-purpose computer.

As would be apparent to one skilled in the art, various functions of circuit elements may also be implemented as processing blocks in a software program. Such software may be employed in, for example, a digital signal processor, microcontroller, or general-purpose computer. Such software may be embodied in the form of program code embodied in tangible media, such as magnetic recording media, optical recording media, solid-state memory, floppy diskettes, CD-ROMs, hard drives, or any other non-transitory machine-readable storage medium, that when the program code is loaded into and executed by a machine, such as a computer, the machine becomes an apparatus for practicing the subject matter disclosed herein. When implemented on a general-purpose processor, the program code segments combine with the processor to provide a unique device that operates analogously to specific logic circuits. Described embodiments may also be manifest in the form of a bit stream or other sequence of signal values electrically or optically transmitted through a medium, stored magnetic-field variations in a magnetic recording medium, etc., generated using a method and/or an apparatus as described herein.

The systems and methods described herein may include and/or may be based on Artificial intelligence (AI). AI can include the concept of creating intelligent machines that can sense, reason, act, and adapt. Machine learning (ML) may be a subset of AI that helps build AI-driven applications. Deep learning can be a subset of machine learning that uses artificial neural networks. Deep learning algorithms can use large amounts of data and complex algorithms to train a model. Neural networks can be the foundation of deep learning algorithms. In machine learning, AI inference can include the process of using a trained model to make predictions. In some cases, AI training can be typically a first step in a two-part process of machine learning. Inference can be faster than training because inference does not include the model adjusting its parameters based on new data. Inference also uses less processing power than training clusters.

The systems and methods described may include and/or may be based on AI search. AI search may include query processing, retrieval, and ranking. In some cases, the systems and methods described herein can include AI query processing by processing-near-memory storage. AI search can process large amounts of data and queries in real time, anticipate user needs based on previous search patterns, deliver accurate and relevant results quickly, automatically refine itself over time, learn from data on users to automatically generate accurate and relevant search experiences, etc. AI search systems can process various types of input, including natural language queries, voice commands, images, contextual information, and the like.

In some examples, the systems and methods may include an attention network. An attention network may include a machine learning technique that identifies the strongest correlations between words in a sentence. An attention network can do this by learning patterns from a training corpus. Attention models may evaluate inputs to identify the most important components and assign each a weight. For example, when translating a sentence, an attention model may select the most important words and assign them a higher weight. Attention mechanisms can be additive or dot-product. Additive attention may use a feed-forward neural network to calculate the compatibility between the query and key vectors. Dot-product attention may use a dot product to measure their similarity. Attention mechanisms can also be self-attention. Self-attention can include a mechanism used in machine learning, particularly in natural language processing and computer vision tasks. Self-attention can allow the model to identify and weigh the importance of different parts of the input sequence and how the different parts relate to one another (e.g., relevance between the different parts of the input sequence or tokens). In some examples, the systems and methods of the present application may incorporate attention networks to perform AI inference delegation techniques described herein.

The systems and methods described may include and/or may be based on information retrieval (e.g., data retrieval, document retrieval, text retrieval, image retrieval, etc.). Natural Language Processing (NLP) may be based on information retrieval, which may include fine-tuning deep language models (LMs) for document ranking. A document retriever model may include a Machine Learning model configured to rank documents in a pool of documents based on some heuristic algorithm and then retrieve the documents that get the best ranks in the pool of documents. When an AI model provides an answer to a query, the AI model may create or obtain a pool of documents. The AI model may use a pre-trained Retriever model and pass the pool of documents along with the query as input to the model. An information retriever may rank the pool of documents based on similarity scores and the top-k documents may be parsed into paragraphs. The AI model may include a Reader model. The AI model may pass the paragraphs along with the query to a Reader model (e.g., ColBERT, etc.) and the AI model may determine the answer based on the Reader model analyzing the query and paragraphs.

The systems and methods described may include and/or may be based on Nearest Neighbor Search (NNS). NNS can include a proximity search technique that finds the point in a set that is closest to a given point. Closeness may be expressed in terms of a dissimilarity function: the less similar the objects, the larger the function values. In some cases, closeness may be measured in terms of distance, where the more similar the objects, the smaller the distances. In some examples, closeness may be expressed in terms of a similarity function, where similar documents have larger scores. NNS may be defined as follows: given a set S of points in a space M and a query point q E M, find the closest point in S to q. A direct generalization of this problem is a k-Nearest Neighbor (KNN) search, where the NNS finds the k closest points. Thus, the k-nearest neighbor search identifies the top k nearest neighbors to a query. In some cases, M is a metric space and dissimilarity is expressed as a distance metric, which is symmetric and satisfies the triangle inequality. Even more common, M is taken to be the d-dimensional vector space where dissimilarity is measured using the Euclidean distance, Manhattan distance or other distance metric.

The systems and methods described may include and/or may be based on Approximate Nearest Neighbor (ANN). The ANN algorithm may be used to identify vectors that are similar to a query vector. The ANN algorithm can include techniques for finding the closest points in high-dimensional spaces. The ANN algorithm may calculate the distance between the vectors in a multidimensional space to identify the vectors that are similar to the query vector. For example, ANN may be used to find an approximation of the closest match or nearest neighbor to a given query point within a multi-dimensional dataset, such as images, documents, feature vectors, etc. ANN may trade off exact accuracy for faster query times, as finding the true nearest neighbor in high-dimensional spaces can be computationally expensive. ANN may be used in applications such as computer vision, machine learning, and data mining, etc. KNN can include a supervised learning algorithm that is used for classification problems. KNN assumes that similar objects are close together. KNN uses proximity to make predictions about the grouping of an individual data point. ANN can differ from KNN in that ANN may search a subset of candidate points in the prediction phase, while KNN may search all training points. ANN algorithms may return points that are at most some specified distance from the query to its nearest points. In some cases, an approximate nearest neighbor can be as good as the exact one. ANN allows for the rapid and effective finding of points in a large, high-dimensional dataset.

The systems and methods described may include and/or may be based on visiting one or more cells based on an approximate nearest neighbor. Visiting a cell may include examining or analyzing (e.g., comparing) a region or cell within a data structure where a data point is located that is relatively close to the query point being searched. Based on the approximation of ANNs, the data point is not necessarily the absolute closest point, the approximation allowing for a faster search by accepting the potential of a small degree of error in the result. Given a query point q, the leaf cell containing the query point may be located. Next, the leaf cells may be enumerated in increasing order of distance from the query point (e.g., priority search). When a cell is visited, the distance from q to the point associated with this cell is computed. The closest point seen so far may be tracked.

In some cases, ANN algorithms may be based on an nprobe value and/or an nlist value. The nprobe value can be an index parameter that sets the number of cells to search (e.g., the number of clusters to visit during a search operation). A cluster may include a group of data points that are more similar to each other than to data points in other groups. A clustering algorithm may be used to group the data into clusters. In some cases, nlist is the number of cells or clusters, and nprobe is the number of cells or clusters visited to perform a search. Increasing the nprobe value increases the search scope. The search time increases linearly with the number of probes. The nprobe value may be set to a value that is less than the nlist value specified for the index-building process. In some cases, nprobe is a trade-off between search performance and accuracy. Increasing nlist leads to more buckets and fewer vectors in a bucket during clustering. This decreases the computation load and improves search performance. However, with fewer vectors for similarity comparison, the correct result might be missed.

An embedding vector can include a mathematical representation of data that uses numbers to capture the meaning and relationships of that data. Embeddings may be used to represent data in a multidimensional space, where similar data points may be clustered together. One way to store and search over unstructured data is to embed the unstructured data and store the resulting embedding vectors, and then at query time to embed the unstructured query and retrieve the embedding vectors that are "most similar" (e.g., maximum similarity (MaxSim)) to the embedding query. Thus, a vector store is a particular type of database optimized for storing documents and their embeddings, and then fetching the most relevant documents for a particular query (e.g., those whose embeddings are most similar to the embedding of the query).

Nearest neighbor search may be referred to as vector search, which is a method in AI and data retrieval that uses mathematical vectors to represent and efficiently search through complex, unstructured data. Vector Search powers AI models with the ability to find specific sets of information in a collection that are the most closely related to a prescribed query. Unlike some searching models that look to find exact matches of information like keyword matches, vector search represents data points as vectors, which have direction and magnitude, in a highly-dimensional space. With vector search, the individual dimensions define a specific attribute or feature and the search compares the similarity of the query vector to the possible vector paths that can and do traverse all of the dimensions.

Vector search can work by associating similar mathematical representations of data, and vector representations, together and converting queries into the same vector representation. With both query and data represented as vectors, finding related data becomes a function of searching for any data representations that are the closest to your query representation, known as nearest neighbors. Unlike some search algorithms that use things like keywords, word frequency, or word similarity, vector search may use the distance representation embedded into the vectorization of the dataset to find similarity and semantic relationships.

The systems and methods described may include and/or may be based on graphical processing units (GPUs) and/or GPU direct storage (GDS). GDS enables a direct data path for direct memory access (DMA) transfers between GPU memory and storage (e.g., avoiding a bounce buffer through the CPU). GDS data transfers between storage and GPU memory can reduce CPU overhead, free up CPU resources for other tasks, and improve overall system efficiency.

Based on some approaches, retrieval systems may encode documents into embeddings using large language models (LLMs). LLMs may use statistical models to analyze large amounts of data, learning the patterns and connections between words and phrases. The underlying transformer of an LLM may be a set of neural networks that includes an encoder and a decoder with self-attention capabilities. Single vector models may generate a single vector representation. Multi-vector models can elevate retrieval quality by encoding documents at the granularity of tokens, resulting in multi-vector representations, which inflates memory requirements for efficient search. Encoders in the context of LLMs may be based on algorithmic structures designed to process and transform input text into a format that a given model can understand and manipulate. LLM encoding may include several layers of computation, where each layer captures different aspects of the language's syntax, semantics, and context.

With some approaches, embedding vector stores in memory (e.g., embedded in-memory vector store in dynamic random-access memory (DRAM)) can come with a relatively high computational cost and may not be scalable for large databases. Also, embedding vector stores in storage drives (e.g., solid-state storage (SSD), NAND-based storage, etc.) may result in frequent copies to memory (e.g., DRAM, high bandwidth memory (HBM)), which increases latency, reducing search performance.

The systems and methods described may include and/or may be based on a bag-of-words. A bag-of-words (BOW) may include a representation of text that describes the occurrence of words within at least one document. A BOW may include a vocabulary of known words and a measure of the presence of known words. A BOW model may include a model of text that uses or generates a representation of text that is based on an unordered collection (e.g., a "bag") of words. In some cases, a BOW may be based on a multi-vector, where a document (e.g., each document of given query operation) may be represented by a matrix (e.g., multiple vectors), where each row in a matrix may represent a token of the BOW (e.g., each token representing a word of the document).

The systems and methods described herein may be based, at least in part, on embedding from a storage pipelined network (ESPN). ESPN may offload re-ranking embeddings (e.g., the entire re-ranking embeddings) to storage drives (e.g., SSDs). Based on ESPN, memory requirement are reduced in relation to approximate nearest neighbor searches. Based on the embedding logic of ESPN, the systems and methods described enable near memory level of query latency when prefetching is under the prefetching budget. For relatively large batch queries (e.g., based on using a Peripheral Component Interconnect Express (PCIe) 3.0 SSD), the embedding logic of ESPN is competitive with memory-based solutions up to a query batch size of 16. ESPN may enable efficient scaling up to a number of batch queries (e.g., up to 256 batch queries) without degrading latency. Prefetching can include techniques for reducing the latency of fetch operations by fetching data or instructions that are expected to be used by a processor in executing some process. Prefetching may be performed before it is known for certain whether the data will be used. Based on the systems and methods described, prefetching may include retrieving a number of embeddings (e.g., a selection of top-k embeddings) in anticipation of the retrieved embeddings being used in approximate nearest neighbor (ANN) processes.

Once a number of the nearest clusters have been explored (e.g., a preset number, a preset portion, a preset percentage, etc.), it is increasingly likely that a significant portion (e.g., greater than a preset threshold value, etc.) of the true nearest neighbors have been identified based on the nearest clusters explored. With those identified true nearest neighbors, the embedding logic can prefetch embeddings from storage (e.g., SSD) with GPU direct storage (GDS), which can mask the embedding data loading latency. In some cases, prefetched embeddings may be placed in memory (e.g., DRAM) and/or in cache memory (e.g., processor cache). In some cases, ANN algorithms trade accuracy for speed by adjusting the nprobe value. After visiting $\delta$ clusters, the embedding logic may generate a list of document IDs that are likely to be accessed after the ANN algorithm concludes searching all $\eta$ clusters. The assumption is that the candidate generation process visits $\eta=(\delta+\lambda)$ clusters where $\delta<<\lambda$ (e.g., $\delta$ is less than $\lambda$ or much less than $\lambda$; $\delta$ is less than 50% of $\eta$ and $\lambda$ is greater than 50% of $\eta$).

FIG. 1 illustrates an example system 100 in accordance with one or more implementations as described herein. In FIG. 1, machine 105, which may be termed a host, a system, or a server, is shown. While FIG. 1 depicts machine 105 as a tower computer, embodiments of the disclosure may extend to any form factor or type of machine. For example, machine 105 may be a rack server, a blade server, a desktop computer, a tower computer, a mini tower computer, a desktop server, a laptop computer, a notebook computer, a tablet computer, etc.

Machine 105 may include processor 110, memory 115, and storage device 120. Processor 110 may be any variety of processor. It is noted that processor 110, along with the other components discussed below, are shown outside the machine for case of illustration: embodiments of the disclosure may include these components within the machine. While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM), Phase Change Memory (PCM), or Resistive Random-Access Memory (ReRAM). Memory 115 may include volatile and/or non-volatile memory. Memory 115 may use any desired form factor: for example, Single In-Line Memory Module (SIMM), Dual In-Line Memory Module (DIMM), Non-Volatile DIMM (NVDIMM), etc. Memory 115 may be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may support an operating system under which various applications may be running. These applications may issue requests (which may be termed commands) to read data from or write data to either memory 115 or storage device 120. When storage device 120 is used to support applications reading or writing data via some sort of file system, storage device 120 may be accessed using device driver 130. While FIG. 1 shows one storage device 120, there may be any number (one or more) of storage devices in machine 105. Storage device 120 may support any desired protocol or protocols, including, for example, the Non-Volatile Memory Express (NVMe) protocol, a Serial Attached Small Computer System Interface (SCSI) (SAS) protocol, or a Serial AT Attachment (SATA) protocol. Storage device 120 may include any desired interface, including, for example, a Peripheral Component Interconnect Express (PCIe) interface, or a Compute Express Link (CXL) interface. Storage device 120 may take any desired form factor, including, for example, a U.2 form factor, a U.3 form factor, a M.2 form factor, Enterprise and Data Center Standard Form Factor (EDSFF) (including all of its varieties, such as E1 short, E1 long, and the E3 varieties), or an Add-In Card (AIC).

While FIG. 1 uses the term "storage device," embodiments of the disclosure may include any storage device formats that may benefit from the use of computational storage units, examples of which may include hard disk drives, Solid State Drives (SSDs), or persistent memory devices, such as PCM, ReRAM, or MRAM. Any reference to "storage device" "SSD" below should be understood to include such other embodiments of the disclosure and other varieties of storage devices. In some cases, the term "storage unit" may encompass storage device 120 and memory 115. Machine 105 may include power supply 135. Power supply 135 may provide power to machine 105 and its components. Machine 105 may include accelerator 155, which may include accelerator memory 170. One or more aspects of systems and methods described may be executed by or in conjunction with accelerator 155.

Machine 105 may include transmitter 145 and receiver 150. Transmitter 145 or receiver 150 may be respectively used to transmit or receive data. In some cases, transmitter 145 and/or receiver 150 may be used to communicate with memory 115 and/or storage device 120. Transmitter 145 may include write circuit 160, which may be used to read/write data (e.g., query embeddings, document embeddings) to storage device 120, memory 115, and/or accelerator memory 170. In a similar manner, receiver 150 may include read circuit 165, which may be used to read data from storage, such as a register, from memory 115 and/or storage device 120.

In one or more examples, machine 105 may be implemented with any type of apparatus. Machine 105 may be configured as (e.g., as a host of) one or more of a server such as a compute server, a storage server, storage node, a network server, a supercomputer, data center system, and/or the like, or any combination thereof. Additionally, or alternatively, machine 105 may be configured as (e.g., as a host of) one or more of a computer such as a workstation, a personal computer, a tablet, a smartphone, and/or the like, or any combination thereof. Machine 105 may be implemented with any type of apparatus that may be configured as a device including, for example, an accelerator device, a storage device, a network device, a memory expansion and/or buffer device, a central processing unit (CPU), a graphics processing unit (GPU), a neural processing unit (NPU), a tensor processing unit (TPU), optical processing units (OPU), and/or the like, or any combination thereof.

Any communication between devices including machine 105 (e.g., host, computational storage device, and/or any intermediary device) can occur over an interface that may be implemented with any type of wired and/or wireless communication medium, interface, protocol, and/or the like including PCIe, NVMe, Ethernet, NVMe-OF, Compute Express Link (CXL), and/or a coherent protocol such as CXL.mem, CXL.cache, Gen-Z, Open Coherent Accelerator Processor Interface (OpenCAPI), Cache Coherent Interconnect for Accelerators (CCIX), Advanced cXtensible Interface (AXI) and/or the like, or any combination thereof, Transmission Control Protocol/Internet Protocol (TCP/IP), FibreChannel, InfiniBand, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, system 100 may include one or more additional apparatus having one or more additional communication interfaces.

Any of the functionality described herein, including any of the host functionality, device functionally, prefetch controller 140 functionality, and/or the like, may be implemented with hardware, software, firmware, or any combination thereof including, for example, hardware and/or software combinational logic, sequential logic, timers, counters, registers, state machines, volatile memories such as at least one of or any combination of the following: dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), GPUs, NPUs, TPUs, OPUs, and/or the like, executing instructions stored in any type of memory. In some embodiments, one or more components of prefetch controller 140 may be implemented as an SoC.

In some examples, prefetch controller 140 may include any one or combination of logic (e.g., logical circuit), hardware (e.g., processing unit, memory, storage), software, firmware, and the like. In some cases, prefetch controller 140 may perform one or more functions in conjunction with processor 110. In some cases, at least a portion of prefetch controller 140 may be implemented in or by processor 110 and/or memory 115. The one or more logic circuits of prefetch controller 140 may include any one or combination of multiplexers, registers, logic gates, arithmetic logic units (ALUs), cache, computer memory, microprocessors, processing units (CPUs, GPUs, NPUs, and/or TPUs), FPGAs, ASICs, etc., that enable prefetch controller 140 to provide systems and methods of memory efficient multi-vector information retrieval for near data computation.

The systems and methods described herein provide Embedding from Storage Pipelined Network (ESPN). The systems and methods described herein include embedding logic (e.g., prefetch controller 140) to provide memory efficient multi-vector information retrieval mechanism for near data computation. Prefetch controller 140 may include any combination of hardware (e.g., at least one memory, at least one processor, accelerator, ASIC, FPGA, etc.), logical circuitry, firmware, and/or software to provide memory efficient multi-vector information retrieval mechanisms for near data computation.

FIG. λ illustrates details of machine 105 of FIG. 1, according to examples described herein. In the illustrated example, machine 105 may include one or more processors 110, which may include memory controllers 125 and clocks 205, which may be used to coordinate the operations of the components of the machine. Processors 110 may be coupled to memories 115, which may include random access memory (RAM), read-only memory (ROM), or other state preserving media, as examples. Processors 110 may be coupled to storage devices 120, and to network connector 210, which may be, for example, an Ethernet connector or a wireless connector. Processors 110 may be connected to buses 215, to which may be attached user interfaces 220 and Input/Output (I/O) interface ports that may be managed using I/O engines 225, among other components. As shown, processors 110 may be coupled to prefetch controller 230, which may be an example of prefetch controller 140 of FIG. 1. Additionally, or alternatively, processors 110 may be connected to buses 215, to which may be attached prefetch controller 230.

Figure 2:
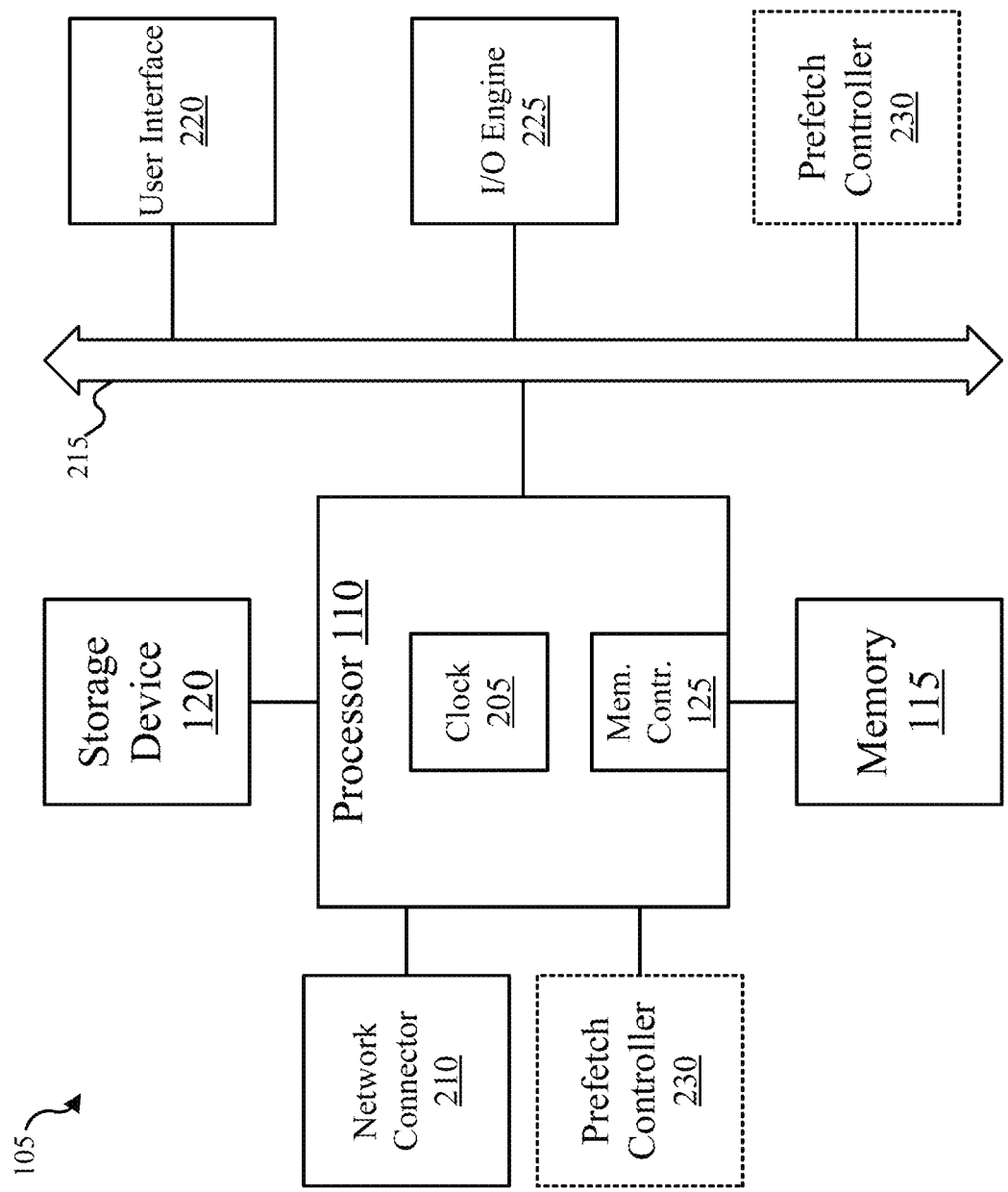
FIG. 2 illustrates details of the system of FIG. 1, according to one or more implementations as described herein.
Figure 3:
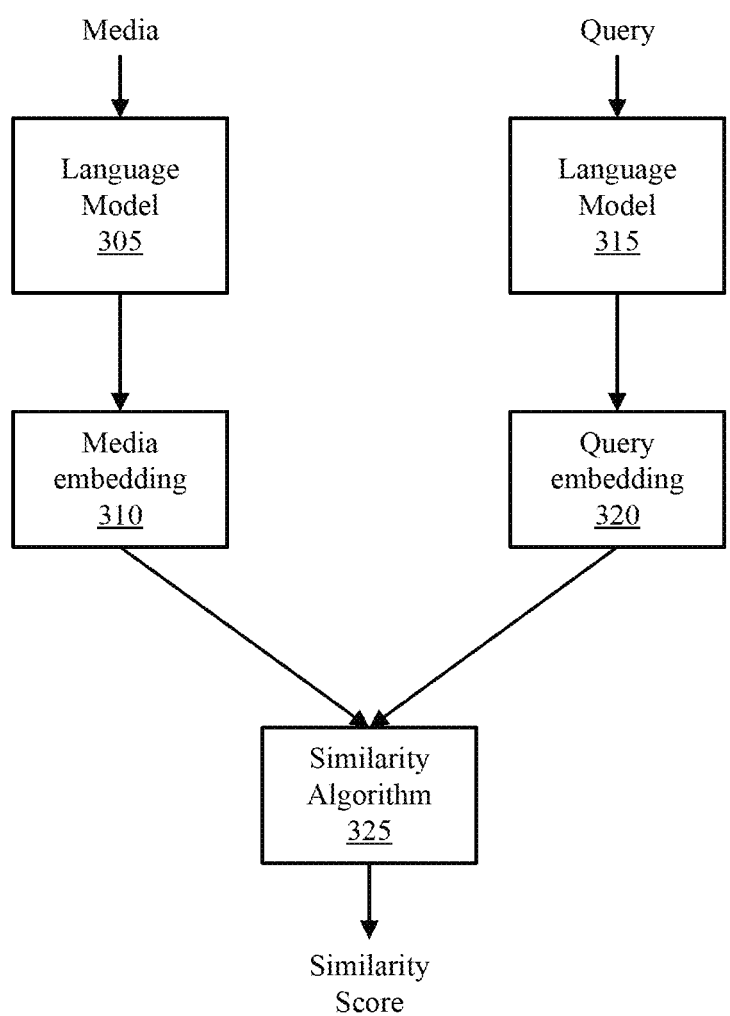
FIG. 3 illustrates an example system in accordance with one or more implementations as described herein.

FIG. 3 illustrates an example process flow 300 in accordance with one or more implementations as described herein. In some configurations, one or more aspects of process flow 300 may be implemented by or in conjunction with prefetch controller 140 of FIG. 1 and/or prefetch controller 230 of FIG. 2. In some configurations, one or more aspects of process flow 300 may be implemented by or in conjunction with machine 105, one or more components of machine 105, or any combination thereof.

In the illustrated example, process flow 300 may include language model 305, media embedding 310, language model 315, query embedding 320, and similarity algorithm 325. In some cases, the operations of language model 305, media embedding 310, language model 315, query embedding 320, and/or similarity algorithm may be performed by one or more processors (e.g., processor 110).

In some cases, language model 305 may include and/or may operate in conjunction with language model 315. In some examples, language model 305 may be trained for one or more forms of media (e.g., AI inference training on documents, images, sound, etc.), while language model 315 may be trained for queries. Language model 305 and/or language model 315 may include and/or incorporate a large language model. In some cases, language model 305 may include software for embedding media (e.g., encoding media, generating a single vector and/or a multi-vector for a media file, etc.). In some cases, language model 315 may include software for embedding queries (e.g., encoding media, generating a single vector and/or a multi-vector for a query, etc.).

As shown, language model 305 may receive media (e.g., text, images, audio) and encode the media. For example, language model 305 may generate media embedding 310 based on the encoding of language model 305. For example, the inference training of language model 305 may train language model 305 to convert a media input into a vector representation (e.g., embedding) of the media. Language model 315 may generate query embedding 320 based on the encoding of language model 315. For example, the inference training of language model 315 may train language model 315 to convert a query input into a vector representation (e.g., embedding) of the query. In some examples, language model 305 may encode the input media offline (e.g., separately or prior to process flow 300 receiving the query). In some cases, media embedding 310 may be stored on a storage drive (e.g., storage device 120). In some cases, language model 305 may generate a single vector embedding and/or a multi-vector embedding. In some cases, a single vector embedding of media embedding 310 may be stored in main memory (e.g., CPU memory or main memory such as memory 115). Additionally, or alternatively, a multi-vector embedding of media embedding 310 may be stored in a storage drive (e.g., storage device 120).

In the illustrated example, similarity algorithm 325 may determine a similarity score based on comparing media embedding 310 to query embedding 320. In some cases, similarity algorithm 325 may compare query embedding 320 to a single vector embedding of media embedding 310 and/or compare query embedding 320 to a multi-vector embedding of media embedding 310.

In some cases, media embedding 310 may be transferred from a storage drive to memory (e.g., accelerator memory 170) and similarity algorithm 325 may compare query embedding 320 to media embedding 310 (e.g., multi-vector embeddings of media embedding 310 transferred to memory). In some cases, similarity algorithm 325 may be executed or implemented by an accelerator (e.g., accelerator 155). In some examples, the similarity score determined by similarity algorithm 325 may be based on a dot product similarity between query embedding 320 and media embedding 310.

Based on the systems and methods described herein, a first ranking of media may be based on comparing query embedding 320 to single vector embeddings of media embedding 310. The top-k media files may be identified based on the first ranking. In some cases, the multi-vector embeddings of the top-k media files may be transferred from storage to memory based on the first ranking. A second ranking of the media may be based on comparing query embedding 320 to the top-k multi-vector embeddings of media embedding 310 that are transferred to memory.

Process flow 300 may depict aspects associated with a hybrid multi-vector retrieval system. Hybrid multi-vector retrieval systems may include at least two sets of retrieval indices: single vector index (e.g., classification (CLS) embeddings, ANN index) and multi-vector index (e.g., multi-vector embeddings, BOW embeddings, multi-vector index). In some cases, a single-vector index may include a single vector configured to represent an input (e.g., one vector per word, per object of an image, etc.). In some cases, a multi-vector index may include multiple vectors configured to represent an input (e.g., a word, an image, etc.). In some cases, a single-vector index of a word may be less precise representation of a multi-vector index of the same word. In some cases, an ANN index may be generated based on the single-vector index. In some cases, the single-vector index may be stored in system memory (e.g., CPU memory), while the multi-vector index may be stored in a storage drive (e.g., SSD). During a retrieval process, data in the storage drive (e.g., multi-vector embeddings) may be read during prefetching and/or during retrieval of multi-vector embeddings missed during the prefetching process. In some examples, one or more multi-vector embeddings may be transferred from the storage derive to accelerator memory (e.g., GPU memory) based on the retrieval process. In some embodiments, a first ranking may be done based on single-vector embeddings and then selected multi-vector embeddings may be read from storage into memory based on the similarity score processing associated with the first ranking. In some cases, a second ranking may be done based on the multi-vector embeddings read into memory.

Figure 4:
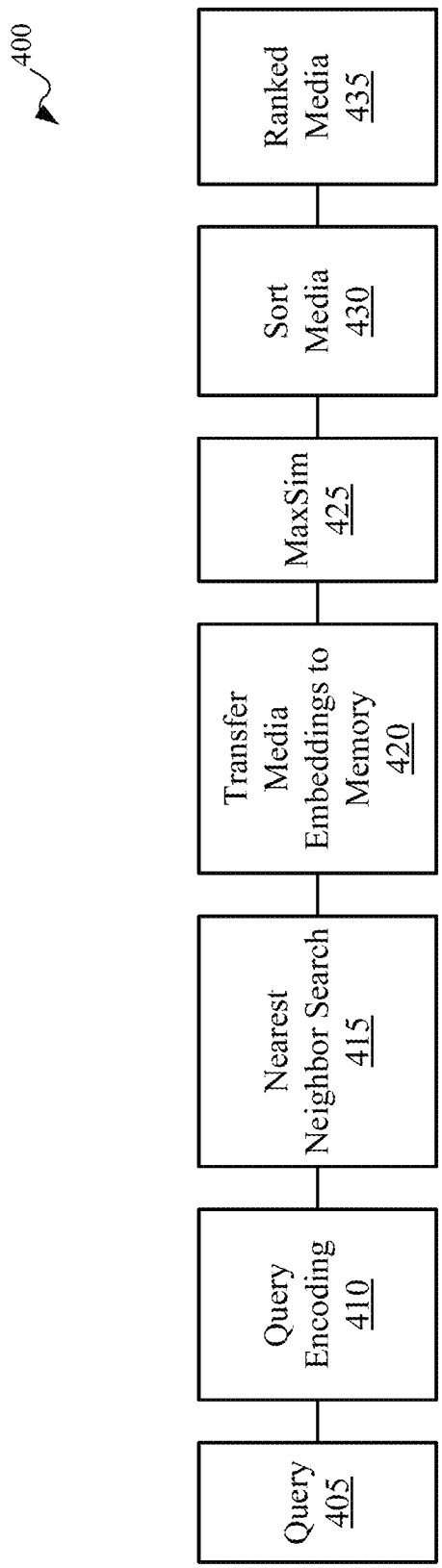
FIG. 4 illustrates an example pipeline in accordance with one or more implementations as described herein.

FIG. 4 illustrates an example pipeline 400 in accordance with one or more implementations as described herein. In some configurations, one or more aspects of pipeline 400 may be implemented by or in conjunction with prefetch controller 140 of FIG. 1 and/or prefetch controller 230 of FIG. 2. In some configurations, one or more aspects of pipeline 400 may be implemented by or in conjunction with machine 105, one or more components of machine 105, or any combination thereof. In some cases, pipeline 400 may depict a sequence of operations of an information retrieval system. The depicted pipeline 400 is just one implementation and one or more operations of pipeline 400 may be rearranged, reordered, omitted, and/or otherwise modified such that other implementations are possible and contemplated.

In the illustrated example, pipeline 400 may be an example of a pipeline of an information retrieval system. At 405, a query may be received by pipeline 400. At 410, based on receiving the query, pipeline 400 may perform query encoding (e.g., LLM query encoding of the received query).

At 415, a nearest neighbor search may be performed based on the query. In some cases, the nearest neighbor search may include an approximate k-nearest neighbor search that performs an information retrieval search and returns the top-k results (e.g., top 100 results, top 1000 results, etc.) determined to be nearest to the query.

At 420, media embeddings (e.g., pre-determined embeddings of text, images, audio) may be transferred from a storage drive to accelerator memory (e.g., GPU memory, accelerator memory 170).

At 425, a similarity algorithm may be performed to determine similarity scores based on the media embeddings and the query embedding. In some cases, the similarity algorithm may be based on Maximum Similarity (MaxSim) algorithm. In some examples, unstructured data (e.g., media) may be converted to embedding vectors and the unstructured data may be stored (e.g., in a storage drive). Based on a query (e.g., query at 405), the unstructured query may be converted to a query embedding (e.g., at 410). After the information retrieval at 415 and transfer of embedding vectors at 420, at 425, pipeline 400 may determine the unstructured data embedding vectors that are most similar (e.g., maximum similarity (MaxSim)) to the embedding query.

Given two embeddings (e.g., query embedding and media embedding), their similarity (e.g., similarity score) may be computed based on a dot product (e.g., matrix multiplication). Based on an example of media including a document, for a query q and a document d, their final similarity score $S_{q,d}$ may be obtained by summing up the maximum similarity between the query embeddings $E_q$ and document embeddings $E_d$. The systems and methods may include determining a similarity score ($S_{q,d}$) based on equation 1 as follows:

$$S_{q,d} = \sum_{i \in [|E_q|]} \max_{j \in [|E_d|]} \left(E_{q_i} \cdot E_{d_j}^T\right) \quad (1)$$

In equation 1, i may represent the index for query vectors and j may represent the index for document vectors. The T in $E_{d_j}^T$ indicates the document vector is transposed. In a multi-vector system, each query and document embeddings may have multiple vectors (e.g., for each word or token in the document). The MaxSim may compute the dot product of a query vector with a document vector (e.g., of the same document) and may store the maximum similarity score between all the comparisons (e.g., in storage, in memory, in a buffer, in cache, etc.). In some cases, the computed similarity scores may determine a final ranking of media (e.g., documents) in response to a query.

At 430, the media may be sorted (e.g., based on similarity scores). At 435, pipeline 400 may determine a final ranking of the media (e.g., a set of ranked documents most similar to the query).

Below, Table 1 shows the index breakdown based on Contextualized Late Interaction over Bidirectional Encoder Representations from Transformers (ColBERT) with enhanced reduction (ColBERTer). Using $E_q$ and $E_d$, ColBERT computes the relevance score between q and d via late interaction, which may be defined as a summation of maximum similarity (MaxSim) operators. In particular, the maximum cosine similarity may be determined (e.g., any similarity metric may be used) of each vector $\in E_q$ with vectors in $E_d$ and the outputs may be combined via summation. Vectors may be the contextualized encodings of tokens given as input to the BERT model (e.g., media embeddings, query embeddings). From Table 1, MS MARCO (MICROSOFT® Machine Reading Comprehension) may include a large-scale dataset that focuses on deep learning related to search functions.

TABLE 1

Index breakdown in ColBERTer

| Dataset | # Passages | # Tokens | # Queries | CLS (GB) | BOW (GB) |
|---|---|---|---|---|---|
| MS MARCO v1 | 8.8M | 597.9M | 6980 | 2.1 | 16.8 |
| MS MARCO v2 | 138.4M | 9.4M | 3903 | 34.6 | 255.4 |

Figure 5:
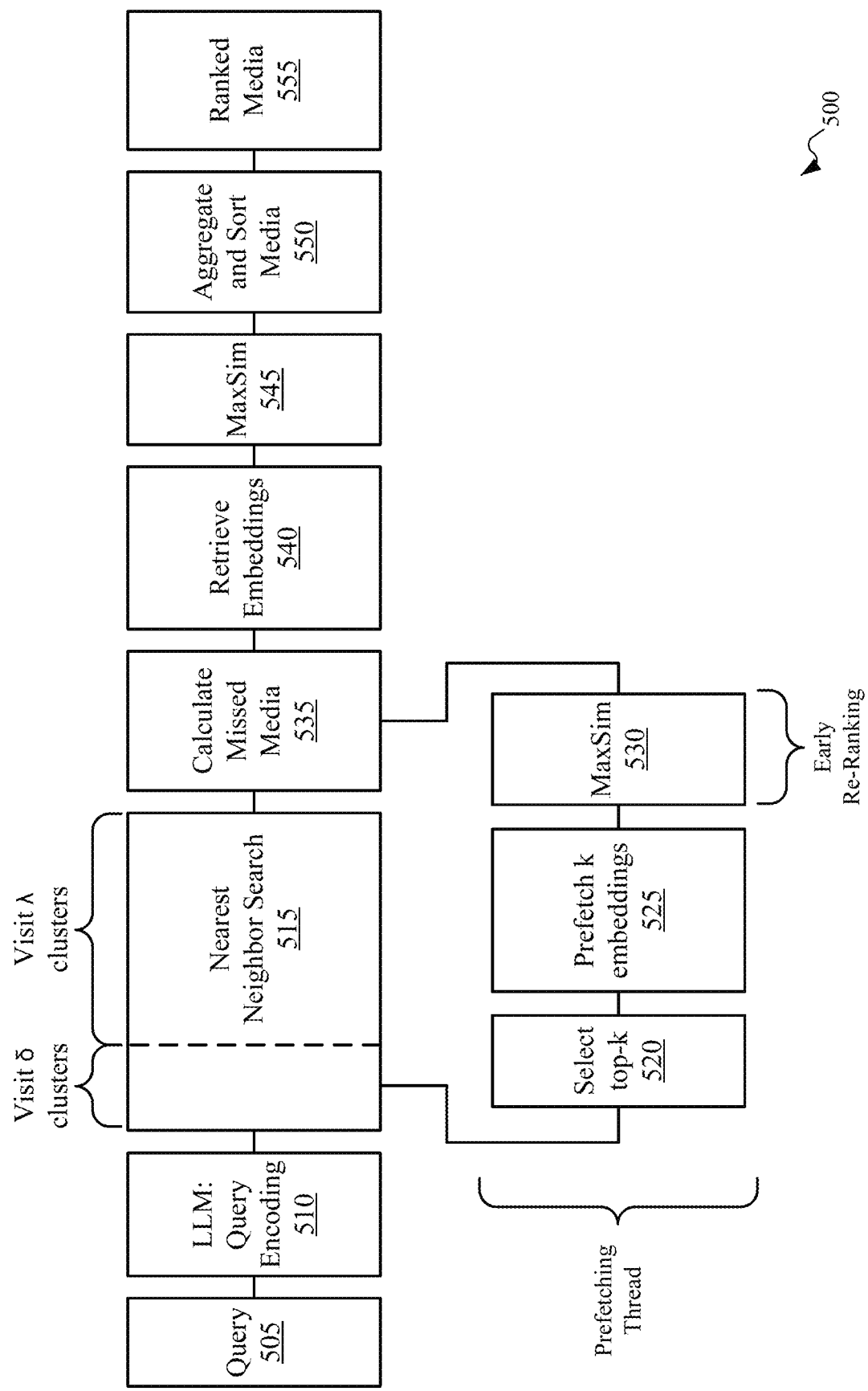
FIG. 5 illustrates an example pipeline in accordance with one or more implementations as described herein.

FIG. 5 illustrates an example pipeline 500 in accordance with one or more implementations as described herein. Pipeline 500 may depict aspects of a retrieval process (e.g., information retrieval) based on the systems and methods described herein. In some configurations, one or more aspects of pipeline 500 may be implemented by or in conjunction with prefetch controller 140 of FIG. 1 and/or prefetch controller 230 of FIG. 2. In some configurations, one or more aspects of pipeline 500 may be implemented by or in conjunction with machine 105, one or more components of machine 105, or any combination thereof. In the depicted example, pipeline 500 may depict an information retrieval system or a pipeline of an information retrieval system. For example, pipeline 500 may illustrate an example system for memory efficient multi-vector information retrieval mechanisms for near data computation. In some cases, pipeline 500 may depict a sequence of operations of an information retrieval system. The depicted pipeline 500 is just one implementation and one or more operations of pipeline 500 may be rearranged, reordered, omitted, and/or otherwise modified such that other implementations are possible and contemplated.

At 505, a query may be received, identified, or obtained by pipeline 500. In some cases, the query may include one or more queries. In some cases, the query may be combined with one or more other queries. In some examples, the systems and methods described herein may be applied to a group of queries.

At 510, the query may be encoded (e.g., LLM query encoding). In some cases, encoding the query may include generating a vector representation of the query (e.g., query embedding). The vector representation may include a single vector and/or a multi-vector representation of the query. In some cases, the vector representation of the query may be stored in memory (e.g., GPU memory such as accelerator memory 170 and/or CPU memory such as memory 115).

At 515, pipeline 500 may include performing a nearest neighbor search. The nearest neighbor search may include an Approximate k-Nearest Neighbor (ANN) search configured to determine the k closest hits (e.g., closest matching media to a query, such as closest documents, closest images, closest audio, etc.). k may be a predetermined value or a default value (e.g., k=100, k=1000, k=10,000, etc.). The ANN search at 515 may be based on comparing a vector representation of a query to vector representations of the searched media sources. The media sources may include any sources of media or any source files of media (e.g., document, images, audio, etc.). In some cases, the comparing may be based on a single vector representation of the query and single vector representations of the media sources. (e.g., comparing a query embedding to a document embedding, an image embedding, or an audio embedding, etc.).

Part of the ANN search of 515 may include visiting or searching δ clusters (e.g., delta clusters), where δ may represent a portion media sources (e.g., media files, documents, images, audio files, etc.) that may be searched at 515. The total number of media sources searched at 515 may be determined (e.g., determined prior to the search, where nprobe indicates the total number of clusters searched at 515). In some cases, the nprobe value η may include at least two portions of clusters (e.g., cells or clusters of media), which may include δ clusters and λ clusters (e.g., lambda clusters). At 515, the δ clusters and λ clusters may be searched by pipeline 500, where n=δ+λ. In some cases, δ may be a fraction or percentage of λ (e.g., δ<<λ, δ is much less than 2). For example, δ may be a relatively small portion of η (e.g., 10%, 20%, 30%, etc.), and λ may be a relatively large portion of η (e.g., 70%, 80%, 90%, etc.). Accordingly, the δ clusters may include a relatively small (e.g., 10%) portion of the total clusters n, and the λ clusters may include the remaining portion of clusters (e.g., 90%) from the total clusters n. As shown, the δ clusters may be searched concurrently while the λ clusters are being searched, thus reducing latency.

At 520, pipeline 500 may include selecting the top-k hits based on searching the δ clusters. The δ clusters may represent some number of clusters (e.g., 5, 10, 50, 100 clusters, etc.), where each cluster may include some number of media sources (e.g., 100, 500, 1000, 10,000, or 100,000 sources of media in a given cluster, etc.). In some examples, searching δ clusters may result in searching a relatively large number of media sources (e.g., between 1,000 and 1 million documents, images, and/or audio files in some examples). In some examples, k may be set at 1,000. Accordingly, at 520, pipeline 500 may include determining the top 1,000 sources of media from searching the δ clusters and select those top 1,000 sources of media. In some cases, selecting the top 1,000 sources of media may include selecting embeddings or vector representations of the top 1,000 sources of media (e.g., multi-vector media source embeddings stored in a storage drive).

At 525, pipeline 500 may include prefetching based on selecting the top-k hits from the searched δ clusters. For example, once pipeline 500 has searched δ clusters, pipeline 500 may include selecting the top-k hits from the δ clusters and prefetching the top-k embeddings of the selected top-k hits. In some cases, prefetching the top 1,000 sources of media may include prefetching embeddings or vector representations of the top 1,000 sources of media (e.g., multi-vector media source embeddings stored in a storage drive). For example, the top 1,000 documents may be identified at 520 based on searching the δ clusters and the embeddings of these top 1,000 documents (e.g., top 1,000 bag of words (BOW) embeddings) may be prefetched. Prefetching may include transferring embeddings from a storage drive to memory (e.g., accelerator memory, GPU memory). In some cases, prefetching or transferring the top 1,000 embeddings may be based on GPU direct storage (GDS) of the top-k embeddings. In some cases, pipeline 500 may include formatting one or more of the embeddings transferred from the storage drive to memory. For example, transferring embeddings from a storage drive to memory may include formatting the embeddings for memory and/or formatting the embeddings for matrix multiplication (e.g., formatting vectors into matrices).

At 530, pipeline 500 may include determining similarity scores for the top-k embeddings in relation to the query embedding. Pipeline 500 may use any similarity algorithm to determine the similarity scores. In the depicted example, the similarity scores may be determined based on a maximum similarity (MaxSim) algorithm. In some cases, pipeline 500 may include ranking the top-k embeddings based on the similarity scores from the highest similarity to the lowest similarity among the top-k embeddings. This ranking may be referred to as an early re-ranking as it occurs while pipeline 500 continues searching the remaining 2 clusters at 515, and occurs before a final ranking of the top-k embeddings of the searched δ clusters and top-k embeddings of the searched λ clusters. As shown, a prefetching thread of pipeline 500 may include operations associated with at least 520, 525, and 530.

At 535, pipeline 500 may include determining any media sources (e.g., documents, images, audio files) that were missed based on the prefetching at 520 and 525. For example, pipeline 500 may include determining the top-k embeddings of the searched λ clusters based on completion of the search at 515. Pipeline 500 may then compare the top-k embeddings of the searched δ clusters to the top-k embeddings of the searched λ clusters. Pipeline 500 may identify sources of media in the top-k embeddings of the searched λ clusters that were missed in the top-k embeddings of the searched δ clusters.

Based on an example of searching documents, after visiting the initial δ clusters (e.g., performing an initial portion of 515), prefetch controller 140 may retrieve the embeddings of the top 4 documents (a, b, c, d), where k has been set to 4. In some cases, pipeline 500 may include determining the document IDs of documents (a, b, c, d). After visiting the remaining λ clusters (e.g., performing the remaining portion of 515), pipeline 500 may include determining that the true top-k neighbors are (a, b, d, h), based on the output of 515 after visiting η clusters where n=(δ+λ). Pipeline 500 may compare the initial prefetched list (a, b, c, d) and the true list (a, b, d, h) to find out which documents were missed. In some cases, pipeline 500 may include comparing the document IDs of documents (a, b, c, d) to the document IDs of documents (a, b, d, h), and determine the difference between the prefetched set of document IDs and the true set of document IDs. Based on the comparison, pipeline 500 include determining that the prefetch processing missed document h. Accordingly, pipeline may retrieve the embedding for document h from the storage drive and transfer this embedding to memory (e.g. accelerator memory).

At 540, pipeline 500 may include retrieving the embeddings of the missed media sources (e.g., multi-vector representations of missed documents, missed images, missed audio). In some cases, pipeline 500 may include performing a GDS retrieval of the embeddings of the missing media sources (e.g., transfer the multi-vector embeddings of the missed documents from a storage drive directly to accelerator memory).

It is noted that a language model (e.g., an LLM, language model 305, etc.) may generate media embeddings offline (e.g., prior to pipeline 500 obtaining the query at 505). These media embeddings may include the embeddings searched at 515, including the top-k embeddings based on the top-k hits from searching the δ clusters, the embeddings based on searching the remaining λ clusters, and/or the embeddings of the one or more missed sources of media. In some cases, these media embeddings may be stored on a storage drive (e.g., storage device 120). In some cases, language model 305 may generate a single vector embedding and/or a multi-vector embedding. In some cases, a single vector embedding of media embedding 310 may be stored in main memory (e.g., CPU memory or main memory such as memory 115). Additionally, or alternatively, a multi-vector embedding of media embedding 310 may be stored in a storage drive (e.g., storage device 120).

At 545, pipeline 500 may include determining similarity scores for the embeddings that have been transferred from storage to memory (e.g., at 525, at 540). Again, determination of similarity scores is depicted as a MaxSim algorithm, but pipeline 500 may use any available similarity score algorithm. Accordingly, pipeline 500 may include determining similarity scores for the top-k prefetched embeddings of the δ clusters, the top-k embeddings of the searched λ clusters, and/or any of the embeddings of the missed media sources.

At 550, pipeline 500 may include aggregating and/or sorting the sources of media (e.g., of the δ clusters, of the searched λ clusters, of the missed media sources). For example, pipeline 500 may aggregate and sort the sources of media based on the similarity scores at 545, providing an overall ranking of the embeddings (e.g., a set of ranked sources of media).

At 555, pipeline 500 may provide a ranked list of closest matching sources of media. Once the sources of media are ranked based on their vector representations, the system and methods may include retrieving the actual sources of media (e.g., actual media files, actual documents, actual images, actual audio files) from wherever the sources of media are stored (e.g., from the Internet, cloud storage, remote memory, a different server, etc.). In some cases, an output of pipeline 500 can be any form of document or form of media (e.g., text, images, webpages, audio, etc.). In some cases, an output may be placed in storage, memory, etc. In some cases, the retrieved files can be sent back to a user (e.g., provided as a response to a user query). For example, the retrieved files may be provided to a user over the Internet via a browser.

In some examples, the systems and methods may include determining a prefetch budget for performing the operations of 520, 525, and 530 in parallel with performing the operations of 515 in relation to the remaining λ clusters. The prefetch budget may indicate an estimate of the period of time that can be taken to perform 520, 525, and 530 while pipeline 500 continues performing 515 in parallel to 520, 525, and 530. Thus, the systems and methods may include determining an approximation of the prefetch budget in relation to search time based on equation 2 as follows:

$$PrefetchBudget \cong \quad (2)$$

$$ANNSearchTime(nprobe = \eta) - ANNSearchTime(nprobe = \delta)$$

where η is the candidate generation process visits (e.g., total number of clusters searched) and δ is the number of clusters visited in prefetching (e.g., a first portion of η). As shown, the prefetch budget may be based on the difference between a search time of η (e.g., approximated nearest neighbor (ANN) search time of all clusters η) and a search time of δ (e.g., ANN search time of δ clusters). In some cases, the ANN search time of δ clusters can be measured through experimental profiling on available hardware. For example, the systems and methods may include measuring how long it takes to compute the ANN search operation of 1000 clusters (e.g., for k=1000). Thus, the prefetch budget may indicate an estimation of the ANN search time of the remaining λ clusters. Thus, as long as the time it takes to perform 520, 525, and 530 is less than or equal to the time it takes to perform the remaining portion of 515 on the λ clusters, then the prefetching process will not increase the latency of pipeline 500, but will be masked the processing of the remaining λ clusters. In some cases, based on the prefetch budget, the systems and methods may adjust the number of documents being prefetched and/or the total number of queries being served simultaneously (e.g., based on the query batch threshold of equation 4). When the number of queries being served is less than the threshold, the prefetching process (e.g., 520, 525, 530) may be performed concurrently with the nearest neighbor search at 515.

The systems and methods may include determining a prefetch step (e.g., δ is 10%, 20%, 30% of η, etc.) based on a ratio of η and δ as shown in equation 3:

$$PrefetchStep = \frac{\delta}{\eta} \times 100\% \quad (3)$$

In some examples, the systems and methods may be applied to multiple queries (e.g., two or more queries processed concurrently). In some cases, a given system may impose a limit on how many queries may be processed in a given batch of queries. Thus, the systems and methods may include determining a query batch threshold based on equation 4 as follows:

$$\text{Query Batch threshold} = \frac{BW_{SSD} \cdot PrefetchBudget}{\text{Data size per query}} \quad (4)$$

where $BW_{SSD}$ is a storage drive bandwidth (e.g., SSD bandwidth, in bytes/second), the prefetch budget may be in seconds (e.g., as determined in equation 2), and the data size per query may be in Bytes. Thus, the query batch threshold may be unitless and indicate the number of queries in a given batch based on the product of $BW_{SSD}$ and the Prefetch Budget divided by the Data size per query. In some cases, Data size per query=vector_dim×num_tokens×k×precision, where vector_dim is a vector dimension from 32 to 1024 (e.g., typically 128); number of tokens depends on a given source of media (e.g., number of words in a document); k is a selected value (e.g., default value or user selected, where k may be a value from 10 to 10,000); and precision is a floating point precision (e.g., FP16, 2 bytes).

The systems and methods described herein include multiple advantages and benefits. For example, the systems and methods maintain or improve system latency while reducing memory requirements, providing savings in both power and cost. Table 2 shows end-to-end Query Latency results in milliseconds (ms) Mmap and Virtual memory versus ESPN (GDS) and ESPN (GDS+prefetcher @ 10%). Table 2 may be based on different memory configurations in MS MARCO v1. As shown, the embedding logic of ESPN provide significant reductions in latency with the different memory configurations from 10 GB to 30 GB.

TABLE 2

End-to-end Query Latency (ms) with Different Memory Configurations

| Retrieval method | Memory | | | | |
| --- | --- | --- | --- | --- | --- |
| | 10 GB | 15 GB | 20 GB | 25 GB | 30 GB |
| Mmap | 183.2 | 142.9 | 86.3 | 56.4 | 53.4 |
| Virtual memory (+swap space) | 76.0 | 65.0 | 59.4 | 52.4 | 45.6 |
| ESPN (GDS) | 54.2 | 54.0 | 52.6 | 52.5 | 52.9 |
| ESPN (GDS + prefetcher @ 10%) | 46.5 | 47.2 | 46.8 | 46.5 | 46.6 |

Table 3 shows end-to-end Query Latency results in milliseconds (ms) for Mmap and Virtual memory versus ESPN (GDS) and ESPN (GDS+prefetcher @ 30%). Table 3 may be based on different memory configurations in MS MARCO v2. As shown, the embedding logic of ESPN provide significant reductions in latency with the different memory configurations from 32 GB to 256 GB, and that virtual memory is out of memory (OOM) for each memory configuration.

TABLE 3

End-to-end Query Latency (ms) with Different Memory Configurations

| Retrieval method | Memory | | | |
| --- | --- | --- | --- | --- |
| | 32 GB | 64 GB | 128 GB | 256 GB |
| Mmap | 271.5 | 236.1 | 198.7 | 188.6 |
| Virtual memory(+swap space) | OOM | OOM | OOM | OOM |
| ESPN (GDS) | 91.2 | 90.7 | 90.02 | 90.05 |
| ESPN (GDS + prefetcher @ 10%) | 85.8 | 85.2 | 84.9 | 85.7 |

Hit rates exceeding 90% are maintained using the prefetching systems and methods described herein based on accessing a portion (e.g., a relatively small portion such as δ clusters) of the embeddings in the critical path of the query. Based on the described techniques, near memory levels of query latency are achieved with lower index memory requirements (e.g., 5-16× lower index memory requirements).

Figure 6:
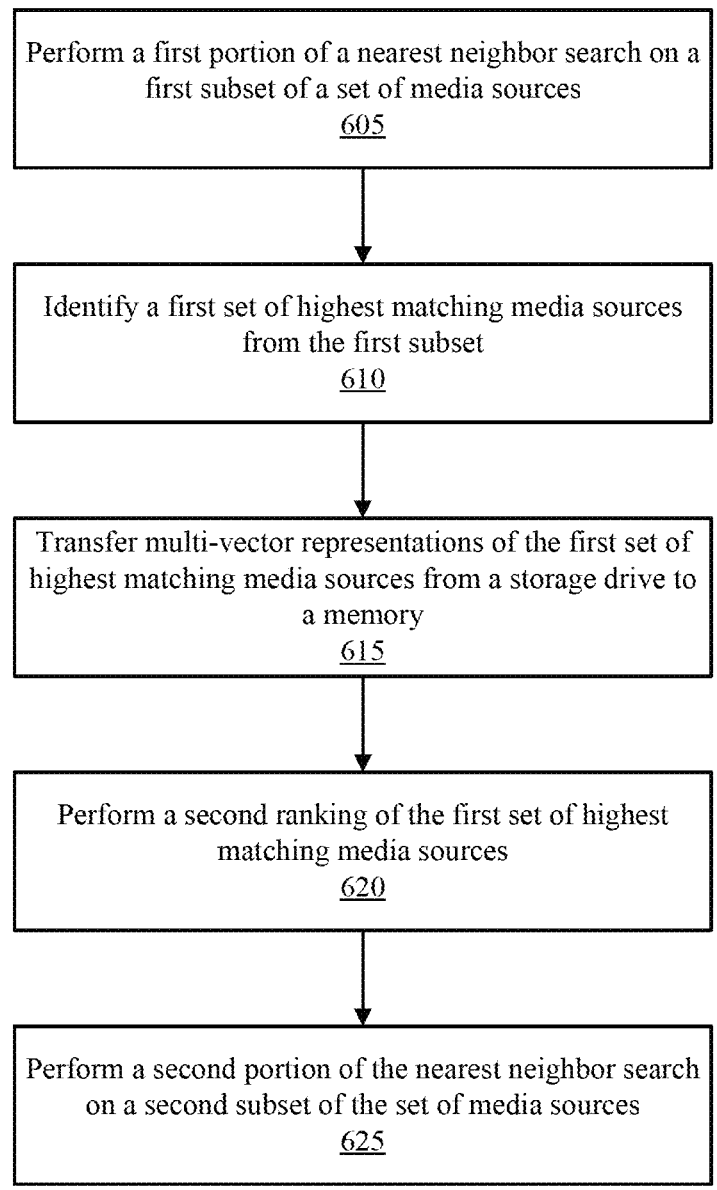
FIG. 6 depicts a flow diagram illustrating an example method associated with the disclosed systems, in accordance with example implementations described herein.

FIG. 6 depicts a flow diagram illustrating an example method 600 associated with the disclosed systems, in accordance with example implementations described herein. In some configurations, one or more aspects of method 600 may be implemented by or in conjunction with prefetch controller 140 of FIG. 1 and/or prefetch controller 230 of FIG. 2. In some configurations, one or more aspects of method 600 may be implemented by or in conjunction with machine 105, one or more components of machine 105, or any combination thereof. The depicted method 600 is just one implementation and one or more operations of method 600 may be rearranged, reordered, omitted, and/or otherwise modified such that other implementations are possible and contemplated.

At 605, method 600 may include performing a first portion of a nearest neighbor search on a first subset of a set of media sources. For example, a retrieval system as described herein may perform a first portion of a nearest neighbor search on a first subset of a set of media sources based on comparing a single vector representation of a query to single vector representations of the first subset.

At 610, method 600 may include identifying a first set of highest matching media sources from the first subset. For example, a retrieval system as described herein may identify a first set of highest matching media sources from the first subset based on a first ranking of the first subset determined from the first portion of the nearest neighbor search. In some cases, the retrieval system as described herein may perform a prefetch process on the first subset, the prefetch process that includes at least one of operations associated with 610, 615, and/or 620.

At 615, method 600 may include transferring multi-vector representations of the first set of highest matching media sources from a storage drive to a memory. For example, a retrieval system as described herein may transfer multi-vector representations of the first set of highest matching media sources from a storage drive to a memory of one or more accelerators based on the first ranking.

At 620, method 600 may include performing a second ranking of the first set highest matching media sources (e.g., based on matrix multiplication analysis). For example, a retrieval system as described herein may perform, via the one or more accelerators, a second ranking of the first set highest matching media sources based on matrix multiplication analysis of the multi-vector representations of the first set of highest matching media sources and the single vector representation of the query.

At 625, method 600 may include performing a second portion of the nearest neighbor search on a second subset of the set of media sources. For example, a retrieval system as described herein may perform, in parallel with the prefetch process, a second portion of the nearest neighbor search on a second subset of the set of media sources based on comparing the single vector representation of the query to single vector representations of the second subset.

Using documents as an example of media searched, a single vector index embedding of a document and a multi-vector embedding (e.g., BOW index) may be generated offline based on a language model (e.g., a fine-tuned language model) processing the document. An ANN indexing operation may use the single vector index to create an ANN index that is stored in memory during a retrieval process (e.g., a retrieval process of pipeline 500). In some cases, the multi-vector embedding of the document (e.g., the multi-vector embeddings of multiple documents) may be stored in a storage drive (e.g., SSD, NVMe SSD, PCIe 3.0 SSD). When a query arrives, the ANN algorithm may use the ANN index (already in memory) to search for relevant documents. After visiting δ clusters, the retrieval system may retrieve the top-k embeddings (e.g., top-k BOW embeddings) from the storage drive and transfer them to memory (e.g., accelerator memory), processing them in parallel with the remaining portion of the ANN search visiting the λ clusters.

After visiting the δ clusters, in some cases the retrieval system may generate a list of document IDs based on the top-k documents from the δ clusters. After visiting all the η clusters (e.g., n=δ+λ), the retrieval system determines the document IDs of the true nearest neighbor. The retrieval system may use the document IDs of the true nearest neighbor to determine the missed documents. For example, the retrieval system may compare the prefetched set of document IDs with the set of document IDs from the remaining ANN search. The embeddings of the missed documents may be retrieved from storage, transferred to memory, and processed in memory. In some cases, re-ranking may use a maximum vector similarity operation or matrix similarity operation (e.g., MaxSim) to compute similarity scores between queries and the top-k documents. In some cases, the top-K document IDs may be sorted using the similarity scores to create a ranked list of document IDs. Based on the ranked list, the actual documents may be retrieved from their respective source (e.g., storage, memory, remote storage, different servers etc.)

Figure 7:
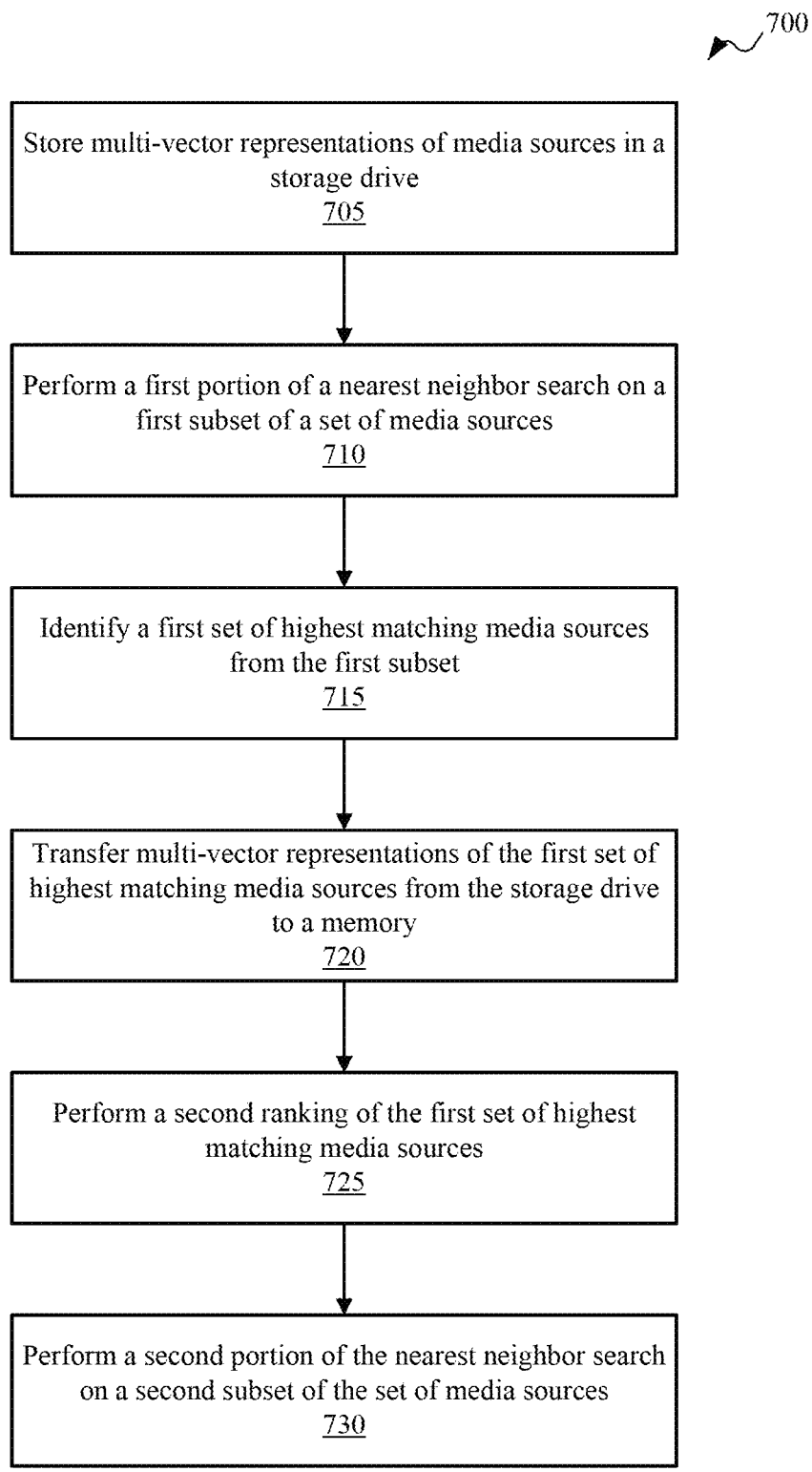
FIG. 7 depicts a flow diagram illustrating an example method associated with the disclosed systems, in accordance with example implementations described herein.

FIG. 7 depicts a flow diagram illustrating an example method 700 associated with the disclosed systems, in accordance with example implementations described herein. In some configurations, one or more aspects of method 700 may be implemented by or in conjunction with prefetch controller 140 of FIG. 1 and/or prefetch controller 230 of FIG. 2. In some configurations, one or more aspects of method 700 may be implemented by or in conjunction with machine 105, one or more components of machine 105, or any combination thereof. The depicted method 700 is just one implementation and one or more operations of method 700 may be rearranged, reordered, omitted, and/or otherwise modified such that other implementations are possible and contemplated.

At 705, method 700 may include storing multi-vector representations of media sources in a storage drive. For example, a retrieval system as described herein may store multi-vector representations of media sources in a storage drive. In some cases, a language model may generate media embeddings offline (e.g., prior to performing a first portion of a nearest neighbor search at 710). In some cases, the language model may generate single vector embeddings and/or multi-vector embeddings of media. In some cases, single vector embeddings of media may be stored in main memory (e.g., CPU memory or main memory such as memory 115). Additionally, or alternatively, multi-vector embeddings of media may be stored in a storage drive (e.g., storage device 120).

At 710, method 700 may include performing a first portion of a nearest neighbor search on a first subset of a set of media sources. For example, a retrieval system as described herein may perform a first portion of a nearest neighbor search on a first subset of a set of media sources based on comparing a single vector representation of a query to single vector representations of the first subset.

At 715, method 700 may include identifying a first set of highest matching media sources from the first subset. For example, a retrieval system as described herein may identify a first set of highest matching media sources from the first subset based on a first ranking of the first subset determined from the first portion of the nearest neighbor search. In some cases, the retrieval system as described herein may perform a prefetch process on the first subset, the prefetch process that includes at least one of operations associated with 710, 715, and/or 720.

At 720, method 700 may include transferring multi-vector representations of the first set of highest matching media sources from a storage drive to a memory. For example, a retrieval system as described herein may transfer multi-vector representations of the first set of highest matching media sources from a storage drive to a memory of one or more accelerators based on the first ranking.

At 725, method 700 may include performing a second ranking of the first set highest matching media sources (e.g., based on matrix multiplication analysis). For example, a retrieval system as described herein may perform, via the one or more accelerators, a second ranking of the first set highest matching media sources based on matrix multiplication analysis of the multi-vector representations of the first set of highest matching media sources and the single vector representation of the query.

At 730, method 700 may include performing a second portion of the nearest neighbor search on a second subset of the set of media sources. For example, a retrieval system as described herein may perform, in parallel with the prefetch process, a second portion of the nearest neighbor search on a second subset of the set of media sources based on comparing the single vector representation of the query to single vector representations of the second subset.

It is noted that the multi-vector representations of media sources of 705 may include multi-vector representations of the first subset of the set of media sources, multi-vector representations of the second subset of the set of media sources, and/or multi-vector representations of missing media sources (e.g., sources of media missing from the first set of highest matching media sources). The multi-vector representations of the first subset may include the multi-vector representations of the first set of highest matching media sources. The multi-vector representations of the second subset may include multi-vector representations of a second set of highest matching media sources that are determined based on the second portion of the nearest neighbor search on the second subset of the set of media sources. In some cases, the multi-vector representations of the second set of highest matching media sources may include the multi-vector representations of missing media sources.

In the examples described herein, the configurations and operations are example configurations and operations, and may involve various additional configurations and operations not explicitly illustrated. In some examples, one or more aspects of the illustrated configurations and/or operations may be omitted. In some embodiments, one or more of the operations may be performed by components other than those illustrated herein. Additionally, or alternatively, the sequential and/or temporal order of the operations may be varied.

Certain embodiments may be implemented in one or a combination of hardware, firmware, and software. Other embodiments may be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wired and/or wireless communication device such as a switch, router, network interface controller, cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be wireless, wired, mobile, and/or stationary.

As used within this document, the term "communicate" is intended to include transmitting, or receiving, or both transmitting and receiving. Similarly, the bidirectional exchange of data between two devices (both devices transmit and receive during the exchange) may be described as 'communicating', when only the functionality of one of those devices is being claimed. The term "communicating" as used herein with respect to wired and/or wireless communication signals includes transmitting the wired and/or wireless communication signals and/or receiving the wired and/or wireless communication signals. For example, a communication unit, which is capable of communicating wired and/or wireless communication signals, may include a wired/wireless transmitter to transmit communication signals to at least one other communication unit, and/or a wired/wireless communication receiver to receive the communication signal from at least one other communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other examples as set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method comprising:
    performing a first portion of a nearest neighbor search on a first subset of a set of media sources based on comparing a single vector representation of a query to single vector representations of the first subset;
    performing a fetch process on the first subset, the fetch process comprising:
        identifying a first set of highest matching media sources from the first subset based on a first ranking of the first subset determined from the first portion of the nearest neighbor search;
        transferring multi-vector representations of the first set of highest matching media sources from a storage drive to a memory based on the first ranking; and
        performing a second ranking of the first set highest matching media sources; and
    performing, in parallel with the fetch process, a second portion of the nearest neighbor search on a second subset of the set of media sources based on comparing the single vector representation of the query to single vector representations of the second subset.

2. The method of claim 1, further comprising:
    identifying a missing media source that is missing from the first set of highest matching media sources based on comparing identifiers of the first set of highest matching media sources with identifiers of a second set of highest matching media sources, the second set of highest matching media sources being determined based on performing the second portion of the nearest neighbor search; and
    transferring a multi-vector representation of the missing media source from the storage drive to the memory.

3. The method of claim 2, further comprising determining a third set of highest matching media sources based on a third ranking of the first set of highest matching media sources, the second set of highest matching media sources, and the missing media source.

4. The method of claim 3, further comprising:
    loading media corresponding to the third set of highest matching media sources into the memory; and
    providing an answer to the query based on loading the media into the memory.

5. The method of claim 1, further comprising:
    storing, based on an offline process performed prior to receiving the query, the single vector representations of the first subset and the single vector representations of the second subset in system memory different from the memory; and
    storing, based on the offline process, the multi-vector representations of the set of media sources in the storage drive, wherein the multi-vector representations of the set of media sources include multi-vector representations of the first subset and multi-vector representations of the second subset, the multi-vector representations of the first subset including the multi-vector representations of the first set of highest matching media sources.

6. The method of claim 5, wherein the first ranking is based on similarity scores determined from comparing the single vector representation of the query to the single vector representations of the first subset.

7. The method of claim 1, further comprising storing the single vector representation of the query in the memory, the memory including memory of one or more accelerators.

8. The method of claim 1, further comprising wherein the first set of highest matching media sources comprises a ranked list of document identifiers.

9. The method of claim 8, further comprising wherein the ranked list includes a set number of document identifiers.

10. The method of claim 1, wherein the set of media sources comprise at least one of a document, text, an image, audio, or metadata of the media.

11. A device comprising:
one or more processors; and
memory storing instructions that, when executed by the one or more processors, cause the device to:
perform a first portion of a nearest neighbor search on a first subset of a set of media sources based on comparing a single vector representation of a query to single vector representations of the first subset;
perform a fetch process on the first subset, the fetch process comprising:
identify a first set of highest matching media sources from the first subset based on a first ranking of the first subset determined from the first portion of the nearest neighbor search;
transfer multi-vector representations of the first set of highest matching media sources from a storage drive to a memory based on the first ranking; and
perform a second ranking of the first set highest matching media sources; and
perform, in parallel with the fetch process, a second portion of the nearest neighbor search on a second subset of the set of media sources based on comparing the single vector representation of the query to single vector representations of the second subset.

12. The device of claim 11, wherein the instructions, when executed by the one or more processors, further cause the device to:
identify a missing media source that is missing from the first set of highest matching media sources based on comparing identifiers of the first set of highest matching media sources with identifiers of a second set of highest matching media sources, the second set of highest matching media sources being determined based on performing the second portion of the nearest neighbor search; and
transfer a multi-vector representation of the missing media source from the storage drive to the memory.

13. The device of claim 12, wherein the instructions, when executed by the one or more processors, further cause the device to determine a third set of highest matching media sources based on a third ranking of the first set of highest matching media sources, the second set of highest matching media sources, and the missing media source.

14. The device of claim 13, wherein the instructions, when executed by the one or more processors, further cause the device to:
load media corresponding to the third set of highest matching media sources into the memory; and
provide an answer to the query based on loading the media into the memory.

15. The device of claim 11, wherein the instructions, when executed by the one or more processors, further cause the device to:
store, based on an offline process performed prior to receiving the query, the single vector representations of the first subset and the single vector representations of the second subset in system memory different from the memory; and
store, based on the offline process, the multi-vector representations of the set of media sources in the storage drive, wherein the multi-vector representations of the set of media sources include multi-vector representations of the first subset and multi-vector representations of the second subset, the multi-vector representations of the first subset including the multi-vector representations of the first set of highest matching media sources.

16. The device of claim 11, wherein the first ranking is based on similarity scores determined from comparing the single vector representation of the query to the single vector representations of the first subset.

17. The device of claim 11, wherein the instructions, when executed by the one or more processors, further cause the device to store the single vector representation of the query in the memory, the memory including memory of one or more accelerators.

18. A non-transitory computer-readable medium storing code that comprises instructions executable by a processor to:
perform a first portion of a nearest neighbor search on a first subset of a set of media sources based on comparing a single vector representation of a query to single vector representations of the first subset;
perform a fetch process on the first subset, the fetch process comprising:
identify a first set of highest matching media sources from the first subset based on a first ranking of the first subset determined from the first portion of the nearest neighbor search;
transfer multi-vector representations of the first set of highest matching media sources from a storage drive to a memory based on the first ranking; and
perform a second ranking of the first set highest matching media sources; and
perform, in parallel with the fetch process, a second portion of the nearest neighbor search on a second subset of the set of media sources based on comparing the single vector representation of the query to single vector representations of the second subset.

19. The non-transitory computer-readable medium of claim 18, wherein the code includes further instructions executable by the processor to:
identify a missing media source that is missing from the first set of highest matching media sources based on comparing identifiers of the first set of highest matching media sources with identifiers of a second set of highest matching media sources, the second set of highest matching media sources being determined based on performing the second portion of the nearest neighbor search; and
transfer a multi-vector representation of the missing media source from the storage drive to the memory.

20. The non-transitory computer-readable medium of claim 19, wherein the code includes further instructions executable by the processor to determine a third set of highest matching media sources based on a third ranking of the first set of highest matching media sources, the second set of highest matching media sources, and the missing media source.

\* \* \* \* \*